US009092651B2

(12) United States Patent
Ching

(10) Patent No.: US 9,092,651 B2
(45) Date of Patent: Jul. 28, 2015

(54) SYSTEM AND METHOD FOR AUTHENTICITY VERIFICATION

(71) Applicant: Play Ventures Limited, Hong Kong (HK)

(72) Inventor: Farn Fan Ching, Hong Kong (HK)

(73) Assignee: PLAY VENTURES LIMITED, Hong Kong (HK)

( * ) Notice: Subject to any disclaimer, the term of this patent is extended or adjusted under 35 U.S.C. 154(b) by 0 days.

(21) Appl. No.: 14/135,620

(22) Filed: Dec. 20, 2013

(65) Prior Publication Data

US 2015/0178521 A1    Jun. 25, 2015

(51) Int. Cl.
*G06K 7/00* (2006.01)
*G06K 5/00* (2006.01)

(52) U.S. Cl.
CPC ........................................ *G06K 5/00* (2013.01)

(58) Field of Classification Search
USPC ......... 235/375, 383, 385, 435, 439, 451, 462; 705/5, 35–45
See application file for complete search history.

(56) References Cited

U.S. PATENT DOCUMENTS

2009/0080760 A1* 3/2009 Knysh et al. .................. 382/141
2013/0092731 A1   4/2013 Pettersson
2013/0211975 A1* 8/2013 Masterson et al. ............. 705/28

OTHER PUBLICATIONS

International Search Report of PCT Patent Application No. PCT/CN2014/093486 issued on Mar. 2, 2015.

* cited by examiner

*Primary Examiner* — Matthew Mikels

(57) ABSTRACT

A system for authenticity verification includes: a unique product identity generation system (UPIDGS) configured for generating a unique product identity (UPID) code corresponding to a product; an anomaly generation and identification system (AGIS) connected with the UPIDGS and configured for generating an anomaly to be inserted into a standard pattern attached to the product; a database and information management system (DBIMS) connected with the UPIDGS and the AGIS; and a unique product identity verification system (UPIDVS) connected with the DBIMS and configured for receiving information from the DBIMS and verifying the authenticity of the product based on the authenticity of the 2D codes and the anomaly. The 2D codes are attached to the product and captured by the DBIMS. The AGIS is configured to locate and identify the anomaly from the product. The DBIMS is configured to determine the authenticity of the 2D codes and the anomaly.

15 Claims, 10 Drawing Sheets

SYSTEM AND METHOD FOR AUTHENTICITY VERIFICATION

FIELD OF THE PATENT APPLICATION

The present patent application generally relates to information and communication technologies and more specifically to a computer implemented system and method for authenticity verification.

BACKGROUND

Counterfeiting is a significant and continuing global problem for brand owners, manufacturers, retailers and consumers. With increased world trade and with companies continually seeking to reduce the costs of production, many products are no longer produced by the manufacturers themselves or in the country where the company is incorporated. Tangible and physical goods are often the target of counterfeiting, especially for branded and popular products. To fight against counterfeiting, it is desired to have a system and a method for authenticity verification of a product or a service that are cost effective, reliable, secure, and easy to implement within global supply chain infrastructures.

SUMMARY

The present patent application is directed to a system for authenticity verification. In one aspect, the system includes: a unique product identity generation system (UPIDGS) configured for generating a unique product identity (UPID) code corresponding to a product; an anomaly generation and identification system (AGIS) connected with the UPIDGS and configured for generating an anomaly to be inserted into a standard pattern attached to the product; a database and information management system (DBIMS) connected with the UPIDGS and the AGIS; and a unique product identity verification system (UPIDVS) connected with the DBIMS and configured for receiving information from the DBIMS and verifying the authenticity of the product based on the authenticity of the 2D codes and the anomaly. The 2D codes are attached to the product and captured by the DBIMS. The AGIS is configured to locate and identify the anomaly from the product. The DBIMS is configured to determine the authenticity of the 2D codes and the anomaly.

The UPID code may be a unique string of alphabet-number-symbol-character (ANSC) combination. One of the two 2D codes may be an overt 2D code that can be directly seen by human eyes, the other one of the two 2D codes may be a covert 2D code being directly visible and masked by a tamper-evident material. For an authentic product, the two 2D codes match with each other.

The UPID may be encoded into the overt 2D code and/or the covert 2D code with a 2D code symbology. The overt 2D code may contain product information that matches the UPID. The overt and covert 2D codes may be identical and encoded from the UPID with a 2D code symbology. The overt 2D code and the covert 2D code may represent a first ANSC string and a second ANSC string respectively, the first and second ANSC strings being combined to produce the UPID, a predetermined ANSC string, or a predetermined ANSC string with the UPID.

One of the two 2D codes may be encoded from the UPID. The other 2D code may be encoded from an ANSC string. The combination of the UPID and the ANSC string may be a predetermined ANSC string.

The AGIS may be configured to insert a reference marker into the standard pattern, the reference marker providing a vector based coordinate within an assigned area on the product for locating the position of the anomaly. One of the 2D codes may contain vector position data indicating a relative position of the anomaly on the product.

The system may further include a scanning device. The scanning device is configured to capture the anomaly, the reference marker and the 2D codes from the product. The scanning device may be configured to encrypt information and exchange the encrypted information with the DBIMS through bluetooth, infrared, WIFI, 2G, 3G, 4G, or LTE communication.

The system may further include a user identity management system (UIMS) and a global time and positioning system (GTPS) both connected with the DBIMS, the UIMS being configured to collect, store, verify, and manage the identity of all users of the system, the GTPS being configured to identify, collect and communicate the time and geo-location information of the scanning device.

The DBIMS may be configured to verify the geo-location of the scanning device transmitted from the GTPS, and the identity of a user transmitted from the UIMS. Upon UPIDVS determining a product is not authentic, the DBIMS may be configured to flag the UPID of the product as being under investigation, to record traces of the user, and to inform the product's stakeholders of the incident.

In another aspect, the present patent application provides a method for authenticity verification. The method includes: generating a unique product identity (UPID) code corresponding to a product; encoding the UPID code into a 2D code; attaching the 2D code to the product; generating an anomaly to be inserted into a standard pattern attached to the product; locating and identifying the anomaly from the product; capturing the 2D code; and determining the authenticity of the 2D code and the anomaly and determining the authenticity of the product accordingly.

The UPID may be encoded into an overt 2D code that can be directly seen by human eyes, and further encoded into a covert 2D code, the covert 2D code being masked by a tamper-evident material and made of a material that dissolves or disappears upon reaction with the environment.

The method may further include the step of inserting a reference marker into the standard pattern, and the step of scanning the anomaly, the reference marker and the 2D codes.

The method may further include the step of verifying the geo-location of the product and the identity of a user and determining the authenticity of the product accordingly.

The method may further include the step of upon determining a product is not authentic, flagging the UPID of the product as being under investigation, recording traces of the user, and informing the product's stakeholders of the incident.

In yet another aspect, the system for authenticity verification includes: means for generating a unique product identity (UPID) code corresponding to a product; means for encoding the UPID into a 2D code; means for attaching the 2D code to the product; means for generating an anomaly to be inserted into a standard pattern attached to the product; means for capturing the 2D code and the anomaly; means for locating and identifying the anomaly from the product; means for collecting, storing, verifying, and managing the identity of all users of the system; means for identifying, collecting and communicating the geo-location information of the product; and means for verifying the 2D code and the anomaly and determining the authenticity of the product accordingly. The product is determined to be authentic if the 2D code, the anomaly, the user identity and the geo-location are verified to be consistent with a predetermined profile.

BRIEF DESCRIPTIONS OF THE DRAWINGS

DETAILED DESCRIPTION

Reference will now be made in detail to a preferred embodiment of the system and the method for authenticity verification disclosed in the present patent application, examples of which are also provided in the following description. Exemplary embodiments of the system and the method disclosed in the present patent application are described in detail, although it will be apparent to those skilled in the relevant art that some features that are not particularly important to an understanding of the system and the method may not be shown for the sake of clarity.

Furthermore, it should be understood that the system and the method for authenticity verification disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
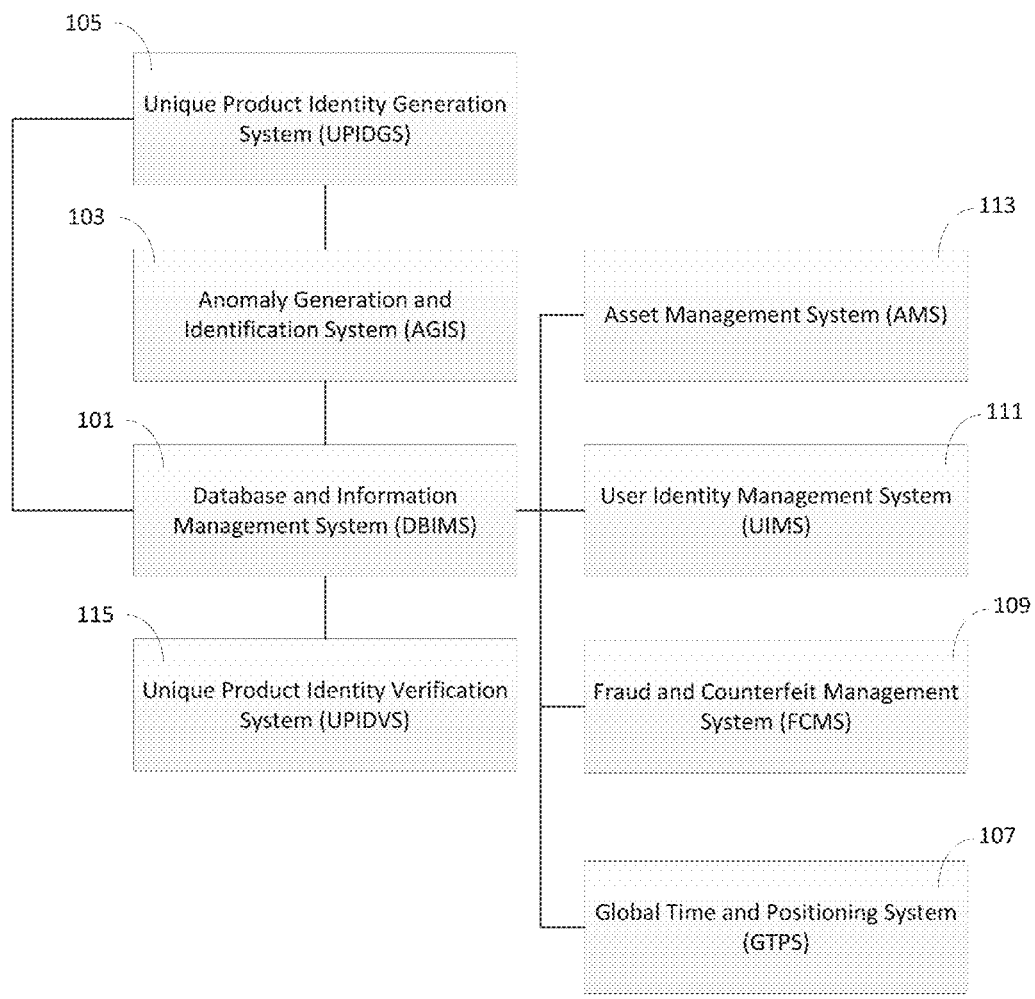
FIG. 1 is a block diagram illustrating the overall architecture of a system for authenticity verification according to an embodiment of the present patent application.

Referring to FIG. 1, a system for authenticity verification according to an embodiment of the present patent application is provided. FIG. 1 shows the overall architecture of the system, which includes a database and information management system (DBIMS) (also referred to as the cloud) 101, an anomaly generation and identification system (AGIS) 103 connected to the DBIMS 101, a unique product identity generation system (UPIDGS) 105 connected with the AGIS 103, a global time and positioning system (GTPS) 107 connected with the DBIMS 101, a fraud and counterfeit management system (FCMS) 109 connected with the DBIMS 101, a user identity management system (UIMS) 111 connected with the DBIMS 101, an asset management system (AMS) 113 connected with the DBIMS 101, and a unique product identity verification system (UPIDVS) 115 connected with the DBIMS 101.

The DBIMS 101 essentially includes the core server(s) that connects, communicates, collects, and verifies information from all third party agents and users. The server(s) include hardware and software that are readily available from cloud service providers. The UPID GS 105, being also connected with the DBIMS 101, includes a set of dedicated algorithms that collect information about any particular product from all related third parties and generate a unique product identity (UPID) code/number, which will be described in more detail hereafter. The AGIS 103 is a system that is configured to use information from the DBIMS 101 and the UPID, and generate one or more anomalies from a library of anomalies. The one or more anomalies may be inserted onto the product, a label of the product, or the product's packaging. The AGIS 103 is also configured to generate a reference marker that provides a vector based coordinate or positioning mechanism within an assigned or unassigned area on the product or label that can be used to locate the position of the anomaly. In addition, the AGIS 103 is configured to use the position, size, shape, angle, color difference, relation to other data on the product or label and other characteristics to identify the correct/genuine anomaly.

The UIMS 111 is a system that is configured to collect, store, verify, and manage the identity of all users of the system. The system makes use of a multitude of software (such as username and password, challenge codes, CAPTCHA, etc.) and hardware (such as identity card, two factor authentication device, biometric device, and etc.) to verify and manage the identity of the users according to relational and hierarchical information, and provides the correct level of access to the system.

The GTPS 107 is a system that is configured to identify, collect and communicate the time and geo-location information from various devices and the products themselves to verify the actual and intended location of the products and devices for authenticity verification.

The UPIDVS 115 is configured to process all information collected from the UPID GS 105, AGIS 103, UIMS 111, GTPS 107 and verify the authenticity of a UPID (and the anomaly), thereby verifying the authenticity of a product.

The AMS 113 is configured to allow third parties and users to manage their assets and products within the global supply chain, including the transfer of ownership of assets and products. The FCMS 109 is configured to detect and notify all related parties of a possible breach of authenticity of a product. The system may be configured to communicate with law enforcement agencies and other third party asset recovery services.

In the above embodiment, a system for authenticity verification includes a unique product identity generation system (UPIDGS) configured for generating a unique product identity (UPID) code corresponding to a product; an anomaly generation and identification system (AGIS) connected with the UPIDGS and configured for generating an anomaly to be inserted into a standard pattern attached to the product; a database and information management system (DBIMS) connected with the UPIDGS and the AGIS; and a unique product identity verification system (UPIDVS) connected with the DBIMS and configured for receiving information from the DBIMS and verifying the authenticity of the product based on the authenticity of the 2D codes and the anomaly. The 2D codes are attached to the product and captured by the DBIMS. The AGIS is configured to locate and identify the anomaly from the product. The DBIMS is configured to determine the authenticity of the 2D codes and the anomaly. The system further includes a user identity management system (UIMS) and a global time and positioning system (GTPS) both connected with the DBIMS. The UIMS is configured to collect, store, verify, and manage the identity of all users of the system. The GTPS is configured to identify, collect and communicate the time and geo-location information of the scanning device. The DBIMS is configured to verify the geo-location of the scanning device transmitted from the GTPS, and the identity of a user transmitted from the UIMS. The embodiment will be described in more detail hereafter.

UPID Generation

A UPID (Unique Product Identification) is a key component of the embodiments provided by the present patent application. In one embodiment, the brand owner of a product provides information about the product that is useful to consumers or required by the laws in the countries or territories in which the brand owner wishes to sell the product in the languages of the countries or territories. Such information is uploaded into a central or distributed cloud server, which can be accessed via the Internet. Such information is formatted to suit a specific requirement to be printed, etched or carved on the product or a label, or adhered onto the product via adhesives or other methods.

At the same time, the brand owner would request for a certain number of products (also referred to as "a run") to be manufactured by itself or a plurality of contract manufacturers. Such requests can be input by a plurality of machines and devices, including computers, handhelds, mobile phones, tablets, and etc. Such run requests, when entered into the cloud system, entail the cloud system to generate a unique product identification (UPID) number/code (not limited to just numerals). Such product ID is unique as there is only one such combination (a string) of alphabets, numbers, symbols and/or characters (ANSC). In addition, this product ID is randomly generated and hence any one UPID is not in any manner sequential to the previous ID or the following ID. Such a random ID may be generated by a random code generator.

A unique product identity (UPID) code, represented by a 2D code symbol, is a string of alpha-numeric-symbol-character (ANSC), encoded using a plurality of symmetric and asymmetric encoding and decoding algorithms and technologies, including but not limited to SHA, MD5, and RSA, and then further encoded into a 2D code symbol using various 2D code symbologies, such as QR codes, GS1 barcodes, EPC, and etc. It is noted that both the UPID and the ANSC can be either human readable or machine readable as encoded in a 2D symbology. It is also understood that being visible/invisible is not the same as being readable/not readable, and that what is readable by a machine may not be readable (i.e. understood) by a human being.

The above-mentioned 2D code symbol will be a part of the etched, carved or printed label of the product. While being not human readable, it is machine or device readable when the machine or scanning device is enabled with software that decodes the 2D code symbol. A variety of scanning devices, such as a mobile phone, scanner, or tablet, when enabled with 2D code reading software, can be used to read the 2D codes. All such scanning devices may also be connected to a wired or wireless network, which in turn is connected to the Internet. Alternatively, the scanning devices may be directly connected to the Internet using a variety of connectivity mechanisms such as EDGE, 3G, WiMax, LTE, and etc. In the embodiment of FIG. 1, the scanning device is configured to encrypt information and exchange the encrypted information with the DBIMS 101 through bluetooth, infrared, WIFI, 2G, 3G, 4G, LTE communication and other present or future communication protocols or technologies.

In another embodiment, the cloud system is configured to further generate another unique string of ANSC, which is a covert code, which will be described in more detail later. According to an algorithm, the two unique strings, i.e. the overt code and the covert code, must combine to form a pre-determined number or alpha-numeric sequence. The pre-determined strings may be changed from time to time.

In one embodiment, the product is of a type such that the brand owner or manufacturer normally assigns a serial number (which may also be unique) to the product. Examples of such products include a hard disk drive, a mobile phone, and etc. The cloud system automatically ties the serial number to the UPID. The serial number may be combined with other information about the product, such as the part number, the stock keeping unit (SKU), the global trade item number (GTIN), and etc.

In another embodiment, the product is of a type such that the brand owner or manufacturer normally does not assign a serial number to the product. Examples of such products include fruits, vegetables and so on, which are sold by weight, volume, or dimensions. In this case, the cloud system is configured to generate a UPID that is independent of any unique number or ID that is associated to a particular product. Again, there may be other non-unique numbers or information such as SKU, GTIN, and etc, which the brand owner or manufacturer wishes to assign to the product or a plurality of the products.

When the request to manufacture or package the product by the brand owner is sent to the cloud, the cloud system is configured to forward such request to the manufacturer including the UPID already generated by the cloud system. During manufacturing, assembly or packing, the pre-formatted information for the product is etched or carved on the product or printed on a label of the product, which is attached to the product using various methods.

Covert Code and Tamper-Evident Layer

According to another embodiment of the present patent application, there are two 2D codes contained within the label of a product. One 2D code is an overt code while the other is a covert code, which is masked by a tamper-evident material. The covert 2D code is also etched, carved or printed on the label of the product, but is masked, veiled or covered by a tamper-evident material, such as scratch cover, a peel off cover, and etc.

According to another embodiment of the present patent application, in using the consumer version of the scanning software, when scanning the overt (i.e. visible) 2D code by the consumer, the system is configured to then challenge the consumer to remove the tamper-evident material to reveal a covert 2D code and/or other alpha-numeric-symbol-character (ANSC). Once the tamper-evident material has been removed, and the covert 2D code or ANSC has been revealed, the product is considered "consumed" and must be paid for or written off as a used product, if not already sold by a retailer.

Figure 2A:
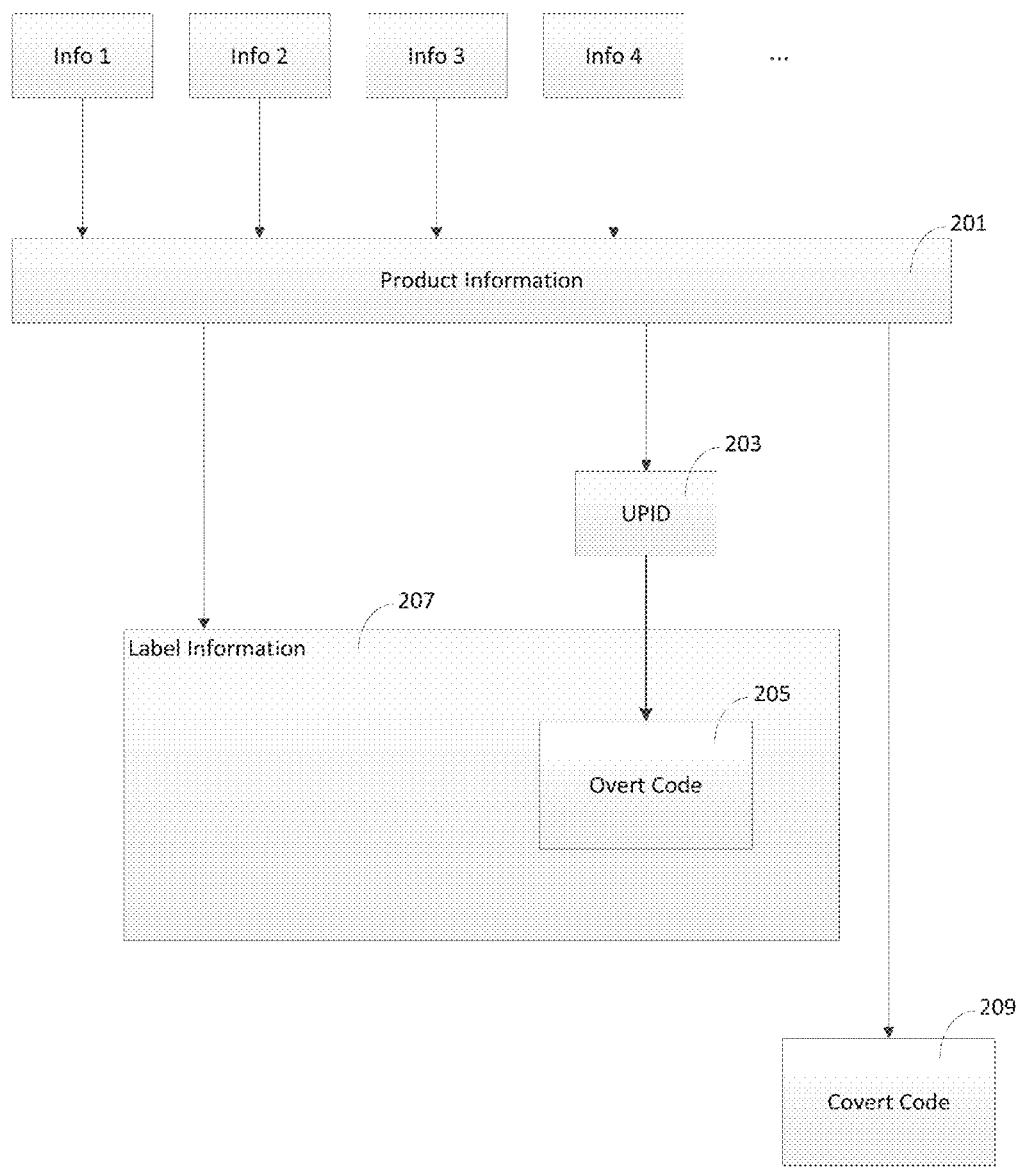
FIG. 2A illustrates the generation of a UPID and 2D codes.

FIG. 2A illustrates the generation of a UPID and 2D codes. Referring to FIG. 2A, product information 201 is used to generate a UPID 203. An overt code 205 is encoded from the UPID 203 and printed as part of the label information 207. A covert code 209 is generated by the UPIDGS 105 which should match the overt code 205. In this embodiment, removing the tamper-evident material may reveal the UPID represented as an ANSC 209. The ANSC 209 may be in visible human readable format. The ANSC 209 must also match with the UPID 203 that is encoded in the overt 2D code 205. In this embodiment, the match refers to the two unique strings must combine to form a pre-determined number or alpha-numeric sequence, as described earlier.

In another embodiment of the present patent application, the overt and covert 2D codes may not just contain the UPID of the product. They may also include product characteristics, specifications, legal and health information, warning, location of origin, manufacture, part number, shipping information, temperature, expiry date, date of manufacture, and etc. (henceforth product information). Depending on the amount of information which the brand owner or manufacturer wishes to capture and store in the 2D code, the brand owner or manufacturer may choose an appropriate 2D symbology that can store the right amount of information.

Figure 2B:
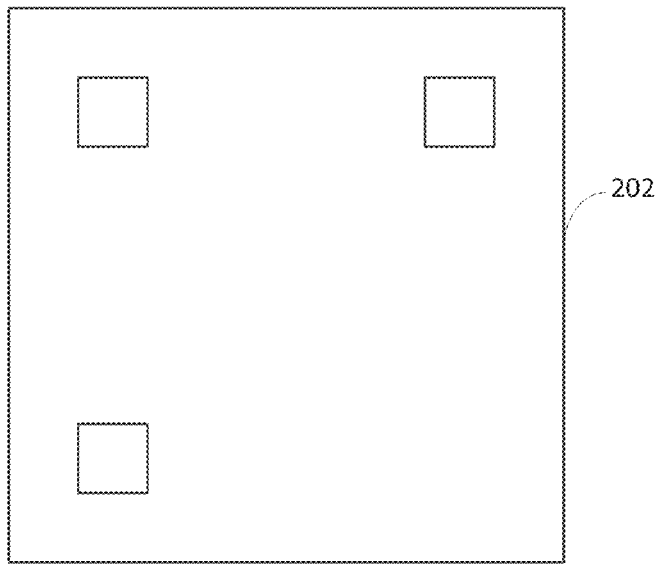
FIG. 2B is a diagram illustrating an overt 2D code and a covert 2D code.
Figure 2B:
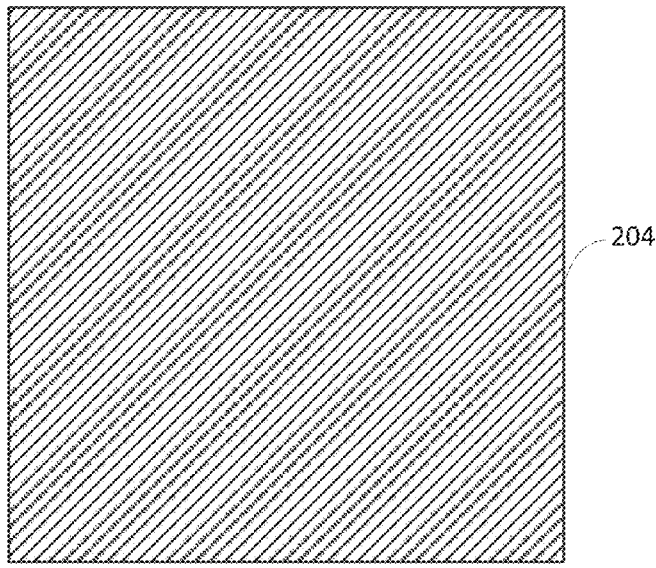

FIG. 2B is a diagram illustrating an overt 2D code 202 and a covert 2D code 204. For an authentic product, the overt 2D code 202 and the covert 2D code 204 match each other. Referring to FIG. 2B, in one embodiment, the overt 2D code 202 contains product information being encoded or represented in a 2D code symbology. The covert 2D code 204 is encoded from a UPID with a 2D code symbology. Alternatively, in another embodiment where the covert 2D code 202 may not contain product information, the overt 2D code 202 and the covert 2D code 204 may be the same and encoded from the UPID with a 2D code symbology.

In yet another embodiment, the overt 2D code 202 and the covert 2D code 204 represent an ANSC string 1 and an ANSC string 2 respectively. For an authentic product, the ANSC string 1 and the ANSC string 2 are combined to produce the UPID. Alternatively, the ANSC string 1 and the ANSC string 2 may be combined to produce a predetermined ANSC string. In still another embodiment, the ANSC string 1 and the ANSC string 2 are combined to produce a predetermined ANSC string with the UPID. In still another embodiment, one of the two 2D codes is encoded from the UPID. The other 2D code is encoded from an ANSC string. The combination of the UPID and the ANSC string is a predetermined ANSC string.

In this patent application, combination of codes, UPIDs and ANSCs refers to two or more pieces of information being subject to a mathematical algorithm that produces a pre-determined string.

Public Key Infrastructure

In all embodiments of the present patent application, for all communication sessions between the cloud server DBIMS, whenever packets of data is transferred between the scanning/reading device and the cloud server, all data streams are further encrypted using a variety of encryption techniques or cryptography, such as symmetric encryption and decryption. An example is public key infrastructure (PKI). This technique is widely used and provides a strong level of security between any two or multi-parties when wishing to verify the identity of both parties and the access to the information of the product. The use of private and public key infrastructure may also include Perfect Forward Secrecy, and may further include the use of multiple factor security, for example a two factor authentication (2FA) device, and the Fast Identity Online Standards including Universal Authentication Framework (UAF) and Universal Second Factor (U2F).

In another embodiment of the present patent application, PKI cryptography is used. The covert 2D code may be encrypted using the public key of a product handler, for example a logistics supplier, wholesaler or retailer. When used to verify the authenticity of the product, the product handler can use his private key to decrypt that covert 2D code.

In another embodiment, using PKI cryptography, the brand owner or the manufacturer may also encrypt its signature alongside the UPID which manifests as a 2D code symbology. In this instance, the signature would be encrypted using the brand owner's or the manufacturer's private key. This signature can only be decrypted by a product handler using the public key of the brand owner or manufacturer, hence, in the process, authenticates the identity of the brand owner or manufacturer.

If in the verification process, there are no two or more instances of the same alpha-numeric strings in the form of i) the overt code, ii) the covert code, iii) or a combination of the two alpha-numeric strings forming a pre-determined string, then the product is considered to be genuine and authentic.

If however the product is counterfeited, copied, stolen or diverted, and that the same overt and covert codes are copied and then read by a user, this will trigger the system will return a warning to the reading device of the user that this product might be subject to counterfeiting activity and report the case to the seller of the product and the local law enforcement authority. A user in the context of this patent application refers to any authorized or unauthorized user of the system who has access to a device enabled with the authorized business software application capable of reading the 2D codes, and a consumer or anyone with a device enabled with a consumer version of the software application.

The cloud system, when receiving two exact alpha-numeric strings in the form of i) the overt code, ii) the covert code, iii) or a combination of the two alpha-numeric strings forming a pre-determined string, would immediately terminate this particular alpha-numeric-symbol-character (ANSC) in the list of acceptable alpha-numeric strings. All parties using the system, including the brand owner, manufacturer, logistics provider, distributor, wholesaler, retailer and consumer (including the first consumer who has been verified of initial authenticity), would be immediately notified of the suspected counterfeit. All products bearing the same ANSC that is read for verifying authenticity would be warned of suspect counterfeit. The first consumer may seek recourse from the retailer or the brand owner of the suspect counterfeit and request for a replacement product, or seek legal resources for compensation.

Figure 3A:
FIG. 3A illustrates how 2D codes may be attached to a product tag by the system for authenticity verification according to an embodiment of the present patent application.
Figure 3B:
FIG. 3B illustrates how 2D codes may be attached to a product packaging by the system for authenticity verification according to another embodiment of the present patent application.
Figure 3C:
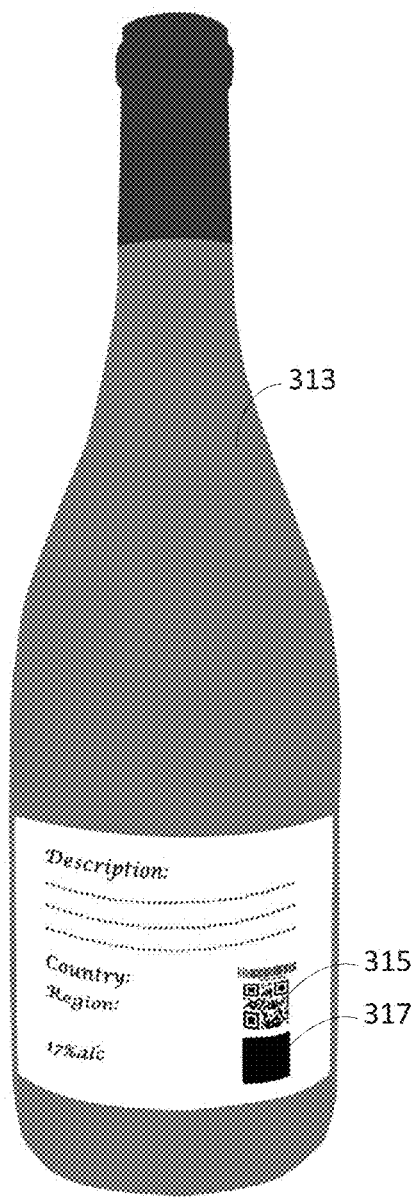
FIG. 3C illustrates how 2D codes may be attached to a product by the system for authenticity verification according to yet another embodiment of the present patent application.

FIGS. 3A-3C illustrates how 2D codes may be attached to a product or product tags/packaging by the system for authenticity verification according to various embodiments of the present patent application. Referring to FIG. 3A, in one embodiment, on a product tag 301, there is an overt code 303 and a covert code 305 masked by a tamper-evident material. In another embodiment, referring to FIG. 3B, on a product packaging 307, an overt code 309 and a covert code 311 masked by a tamper-evident material are printed. In yet another embodiment, referring to FIG. 3C, on a wine bottle 313, an overt code 315 and a covert code 317 are etched in the body of the bottle 313.

Anomaly

Throughout the embodiments described in this patent application, the word anomaly refers to any text, shape, picture, color, character, symbol, drawing, or other marking that deviates from a surrounding standard, normal or expected pattern but blends into the surrounding pattern and is difficult to be distinguished from the surrounding pattern.

An anomaly may be inserted into a product or the label of a product. The label may be affixed to the product itself, or on the container or packaging of the product. The label may be printed, etched, marked directly onto the product itself, or it could be printed on a piece of paper, plastic or any material that has a sufficiently large surface, and can be affixed onto the product, via adhesives, soldering, or a variety of other fastening methods.

The anomaly may be inserted anywhere within the label which includes places exhibiting information about the product, including and not limited to, the brand logo of the product, the product brand, name, model, part number, serial number, date of production, location where the product is produced, manufacturer of the product, chemical composition, health information, health warnings, legal information, legal warnings, bar codes, or other symbols in one or more languages, complying with the legal requirements of the country or region in which the product is sold.

The anomaly may include a color difference, a same color in different shades, a different text, a different text style, a different stroke in a character, a spot or blemish, an extension, expansion, contraction, or compression of a length, area, stroke, line, or size of a text, shape, picture, color, character, symbol, drawing or other marking.

Although being difficult to distinguish from the normal surrounding pattern, the anomaly is not meant to be invisible. The visibility of the anomaly generally does not require the use of a microscopy or other viewing devices. The difficulty of identifying the anomaly mainly lies in one would normally not associate the readily visible deviation with an anomaly. All information that the label intends to convey remains unchanged with the presence of the anomaly. The anomaly is designed in a way that it remains an integral part of the information or artwork that is meant to be conveyed to the consumer.

The anomaly serves as a part of the overall authenticity verification system provided by the present patent application. The product or label may include a bar code or any other 2D code symbology. Any user using a handheld device, such as a scanner or mobile phone with a photo or video recording function equipped with a 2D scanning software, would be able to read the 2D code.

Figure 4:
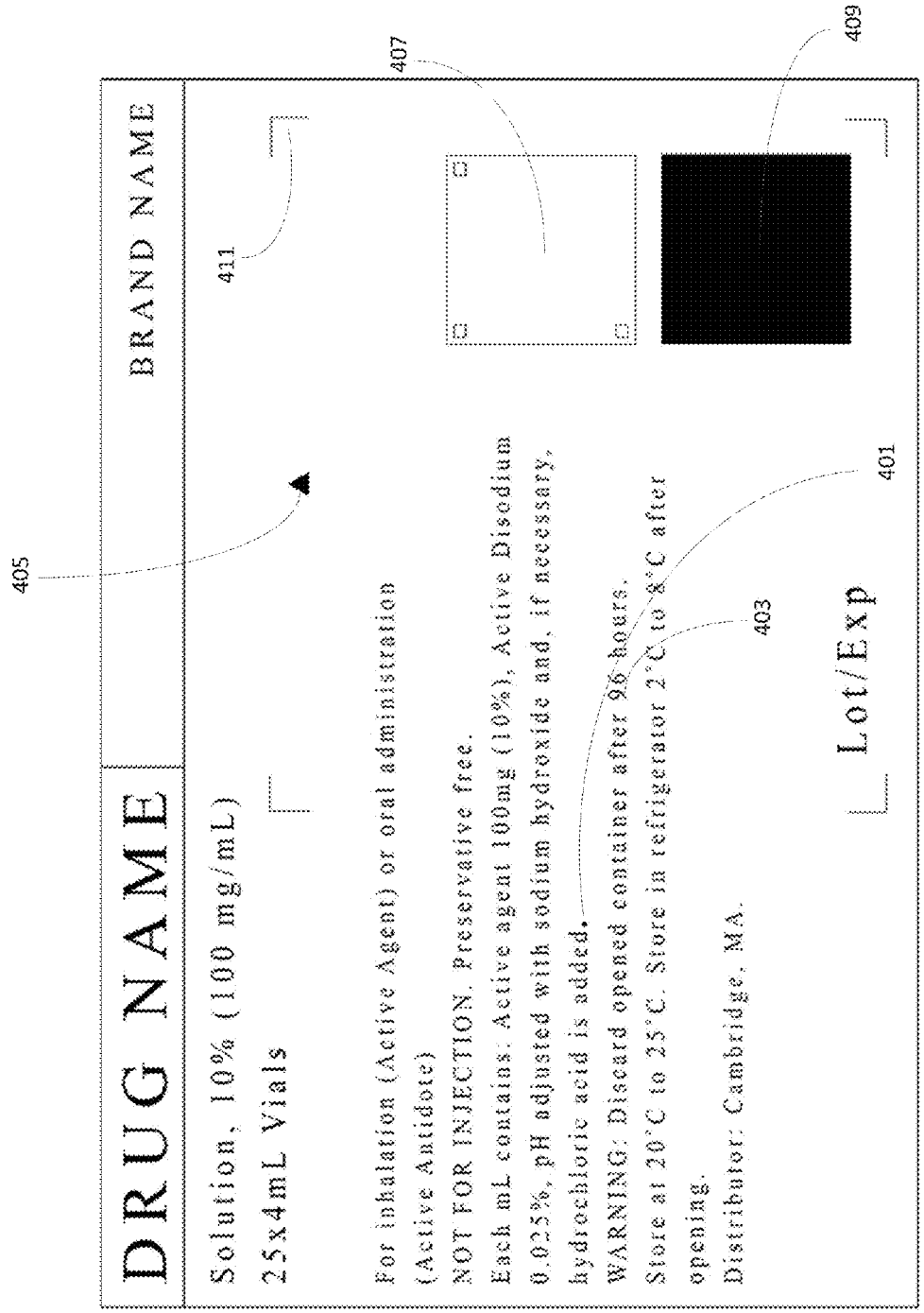
FIG. 4 illustrates multiple anomalies being inserted into a label of a pharmaceutical product.

FIG. 4 illustrates multiple anomalies being inserted onto a label of a pharmaceutical product. Referring to FIG. 4, the period sign 401 is printed green. The number "9" (403 in FIG. 4) is printed in a shape deviating from the standard font for "9", with a curve at the bottom. Both 401 and 403 are anomalies being inserted. In addition, the label includes an overt code 407 and a covert code 409.

Figure 5A:
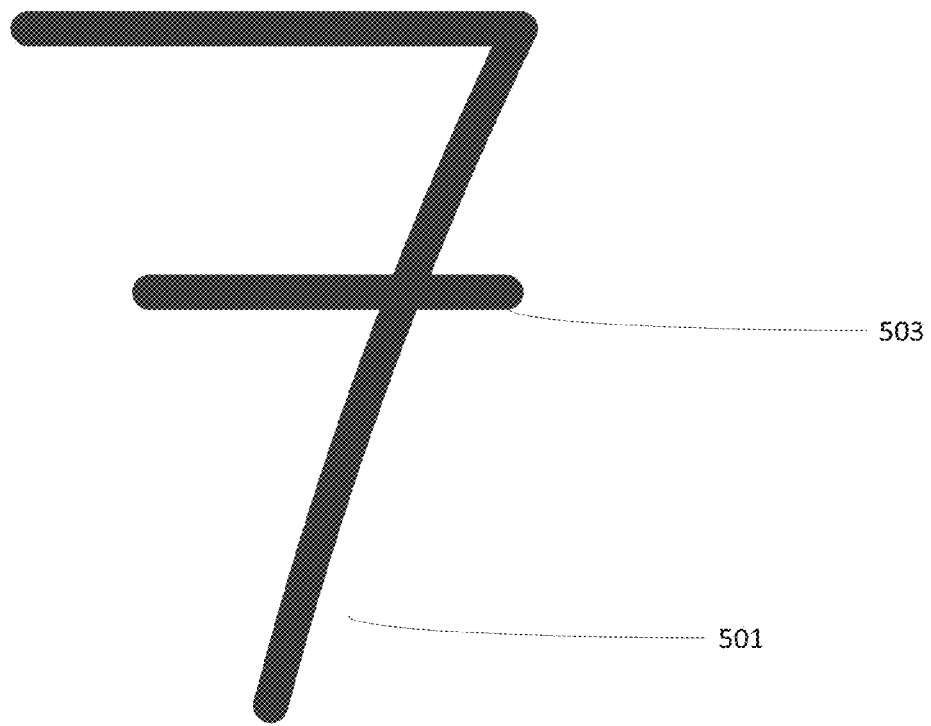
FIG. 5A illustrates an anomaly based on a numerical number.

According to another embodiment of the present patent application, one or more anomalies as aforementioned may be embedded in the product information etched, carved or labeled on the product. The product information may be written using text, symbols and/or pictures and photographs. For example, it is not within the cloud system of presenting and recognizing the number 7 (501 in FIG. 5A) with a short horizontal stroke (503 in FIG. 5A) in the middle of the number.

Figure 5B:
FIG. 5B illustrates anomalies that may be present within a 2D code.

This anomaly may be within a designated scanning area of the etched pattern, carving or label, which may be depicted using four right-angled markings (411 in FIG. 4) which indicates a square or rectangular area. The scanning device, when reading the area, is configured to read both the 2D code and the anomaly to determine the authenticity of the product. The 2D code may contain vector position data indicating the relative position of the anomaly within the label on the product. The function of the anomaly is that any counterfeiters when reproducing the label would ignore the anomaly and choose to concentrate on reproducing the overt and covert 2D codes and/or ANSC. Moreover, even when used with an optical character recognition scanning machine or device, the counterfeiter's optical character recognition (OCR) software would not be able to detect the anomaly, given that the anomaly can be any text, shape, picture, color, character, symbol or other marking that any OCR today or in the future is not able to determine. In another embodiment, as illustrated in FIG. 5B, anomalies 505 and 507 may be present within a 2D code 509. It is noted that in the embodiment, more than one anomaly may be generated and inserted into a standard pattern attached to a product.

In an embodiment, a reference marker or reference point or position marker or position point may be present in the designated scanning area. This reference marker or point may be any alphabet, number, symbol or character. The function of the reference marker is to guide the scanning device and software to correctly locate the anomaly by providing a vector coordinate of the anomaly. Referring to FIG. 4, the marker 405, as an example of such reference marker, is present in the designated scanning area defined by four small angles 411. It is understood that in this embodiment the scanning device is configured to capture the anomalies (401 and 403), the reference marker (405) and the 2D codes (407 and 409) from the product.

In an alternative embodiment, the aforementioned designated scanning area is not required. The system is configured to pick out the location of the anomaly from decoding the 2D code, which provides vector coordinates of the anomaly.

In another embodiment, the covert 2D code is initially masked or covered with a tamper-evident material. When the mask (tamper-evident material) is tampered and removed, the covert 2D code is revealed. Once the tamper-evident material is removed, the product is deemed to have been consumed by the user tampering with the mask.

In this embodiment, the software is configured to read both overt and covert 2D codes and locate the anomaly, either within an enclosed area or within the label, and either with a position marker or without one. The decoded information will be sent to the cloud server for verification.

In still another embodiment, the decoding is not done at the client or user end. The decoding of information might be stolen with signal 'listening' technologies and devices. All data transmission between the client device and the cloud server is encrypted in all embodiments including this one.

Once the anomaly is found and read, the system is configured to further decode the UPID, which will be sent to the cloud server for verification of this UPID. The location of the scanning device, deduced by retrieving the IP address of the scanning device will also be sent to the cloud server as part of the verification process. The location of the scanning device may also be determined using triangulation of mobile signals if the scanning device is a mobile device. A time stamp may also be captured on the device from the act of scanning. If the UPID is determined to be unique and located at the location that it is supposed to be, then the product is determined to be genuine or unique and a notification will be sent back to the scanning device via the Internet to inform the user so.

In the event that the UPID is not a string recognized or stored within the cloud server, then a notification that the product is not authentic is sent to the user. In the event that the UPID has been found to be attempted to be verified more than once, the cloud server is configured to send a notification that this product might be subject to counterfeit to the user. In the event that the UPID has been attempted to be verified in more than one location, the same notification about possible counterfeiting will be sent to the user by the system.

In the events where there is a breach or a possible breach of authenticity, related parties including the brand owner, manufacturer(s), logistic supplier(s), wholesaler(s), distributor(s) and retailer(s) may be notified by the system of a breach or possible breach. In another embodiment, the local law enforcement agencies and third party asset recovery services may also be notified.

Application Software

Each business user in the logistics supply chain from the manufacturer to the retailer would have a device that is installed with a business application software connecting to the cloud server. This business application software is only available to businesses and its employees. This business application software is different from the consumer version of the software. This business version would not be able to read the covert 2D code. An authorized device refers to a device that is registered to a business within the global supply chain of the product and its authorized employees. An unauthorized device does not refer to a consumer device or a device installed with the consumer version of the application software. The cloud server is configured not to allow these two different versions of the application software to be installed in the same device.

A consumer user would need to have a suitable device in which a consumer version of the application software is installed. This consumer version of the software is configured to read both overt and covert 2D codes as aforementioned.

In all embodiments, prior to the decoding of the overt 2D codes, the unique serial number of the scanning device is sent to the cloud server to determine whether the device is an authorized device. If the device is unregistered or unauthorized, it is not possible for it to decode the 2D codes. If a third party 2D code reading software is used on a registered or authorized device, the third party software may be able to read the code but will not be able to carry out the verification process.

Code Expiration

According to an embodiment of the present patent application, the covert 2D code may be set to expire if the product is not read by the next business user within a preset time limit, or if the prior business user does not inform the cloud server that the deadline is postponed.

In another embodiment, the scanning of the overt 2D code by business users signifies a transfer of possession of the product in the global logistics supply chain, for example, from logistics provider 1 to logistics provider 2, in a cross-border shipment. Each logistics provider would know the route for delivery that the particular logistics provider company is responsible for. However, a particular logistics provider might not know the final destination of the product delivery. In the case where the product is diverted, the time until the next scanning of the code by the next logistics provider would be delayed. If the current logistics provider in transit with the goods does not update the cloud server with the delay, for example, due to bad weather, and within a tolerance length of time, the cloud server may render those codes and hence the products with those codes invalid. This prevents counterfeit activities being carried out by rogue logistics providers or counterfeiters.

In another embodiment, the covert 2D code (not the tamper-evident material) may be made of a material that dissolves or disappears upon reaction with the environment, such as light, moisture, oil, grease, human or animal fatty acids, chemical, and etc. In one embodiment, if the tamper-evident material has been compromised, the exposed covert 2D code may be printed with an ink or material that would dissolve or disappear after exposure to light, moisture or other contaminants after a specific length of time. This prevents the product from being re-circulated into the flow of commerce. In addition, if the covert 2D code is made of dissolvable material or material that would disappear due to contamination or chemical reaction with the environment, then by inference, exposed codes which are non-dissolvable or unable to disappear after a specific length of time are deemed to be counterfeit products.

User Identity Verification

According to another embodiment, when changing possession or turning over products between two parties within the global supply chain in the transportation or delivery of the product from the manufacturer to the retailer, during the scanning of the overt 2D code to transferring possession and verifying the authenticity and ownership of the product, one or more challenges is issued to the user to verify his/her identity and ensure the person has knowledge of the product including the next destination of the product. Such challenges may include requiring the user to enter or input the following information:

i) a username and password;
ii) information acquired through biometric verification, eg. thumb scan, iris scan, voice recognition, face recognition, etc;
iii) a series of text (numbers, alphabet letters or a combination of both) via a two factor authentication (2FA) device which is unique and issued to each business user/employee handling the shipment;
iv) answers to questions which only users of that particular business assigned to handle that particular shipment of the product would know, such as the next destination of the product, the final destination of the product, personal particulars about the user (for example name, age, address, mobile phone number, spouse name, number of children, height, hair color, iris color, the date/month/year he/she joined the company, awards he/she has received, or any information which may be or already has been documented by the business/company) in order to verify that this person is indeed the person handling the product;
v) other random or personal questions which the user has provided to the business/company as part of the job requirement. For example, Question: "Who taught you Math in school?" Answer: "Mr. Barrack Obama". The answer to the question need not be factually correct.

In this embodiment, further security features may be built into the system so that the products are handled by the right person. Some examples include:

i) a request for approval sent to the supervisor of the business user handling the product for an employee to proceed with the handling;
ii) likewise the supervisor might need to enter text provided by a TFA device and may be posed with a series of challenge questions pertaining to himself/herself as described above.

According to another embodiment, if a product is not verified to be authentic or is stolen, upon request by the brand owner, manufacturer, police or government, the company or its authorized agents may flag the UPID as being under investigation, to record traces of the user, and to inform the product's stakeholders of the incident. The DBIMS of the system is configured to implement the above. The cloud server is configured to notify the user that the product may be counterfeit. It may be further configured to issue a challenge if there is a request for authenticity verification after the complaint. The challenge may include questions described above. Such a request may also activate the camera to capture a photograph of the user if a smart phone with a camera is used for the request. If the photograph of the person is an authorized person or any of the challenges that are posed to the person is answered correctly, then the cloud system is configured to either issue more challenges or stop after a specific number of challenges. The system may be configured to also extract the phone number. In all cases, the IP address and or triangulation of the location of the device are captured. Such captured information may be sent to the cloud server for appropriate recovery actions. In addition, the challenge may require the person to report the product to the cloud server or to law enforcement agencies.

Consumer End Authenticity Verification

In yet another embodiment, after a retailer has scanned the overt 2D codes, the cloud server will indicate that the product is marked as for sale to consumers. The scanning device used by the consumer may not be initially registered with the cloud server. In order to verify the authenticity of the product, the user must download an application software into his/her device in order to scan the 2D codes. The consumer version of the application software is different from that of a business user. A scan of the overt 2D code by a consumer may reveal information about the product, such as the dimensions, physical attributes, specifications, country of production, legal and health information, warnings of the product, and etc. In order to verify the authenticity, the consumer would have to unmask the covert 2D code from the tamper-evident material. A scan of the now revealed 2D code would start the verification process and the cloud server is configured to return a positive or negative reply to the user on the authenticity of the product. Once the tamper-evident material has been removed, the product would be considered "consumed" and payment by the consumer to the retailer would already have been made or would have to be made immediately after.

If the final scan done by the retailer prior to placing the product on the shelves of the retail shop shows that the product is suspect of counterfeit, the retailer would not accept the product and ask for a refund or a replacement product from the seller or logistics company delivering the product to him/her. Therefore by inference, all products on the shelves of the retailer must be authentic products, unless it is the full intention of the retailer to accept and sell counterfeit products.

In the case where a consumer does not have an appropriate device or the appropriate application software to scan the 2D codes, a retailer may be equipped with a device installed with a consumer version of the application software (hence a business version can not be installed in the same device). The retailer may help the consumer scan the 2D codes on his/her behalf but once the covert code is revealed, this would be equivalent of "consuming" the product. The retailer will either collect payment before removing the mask to reveal the covert 2D code or collect payment immediately after verifying the authenticity of the product. In either case, if the product is not authentic, the retailer will either refund the consumer or provide another item of the same product to the consumer and verify its authenticity.

Figure 6:
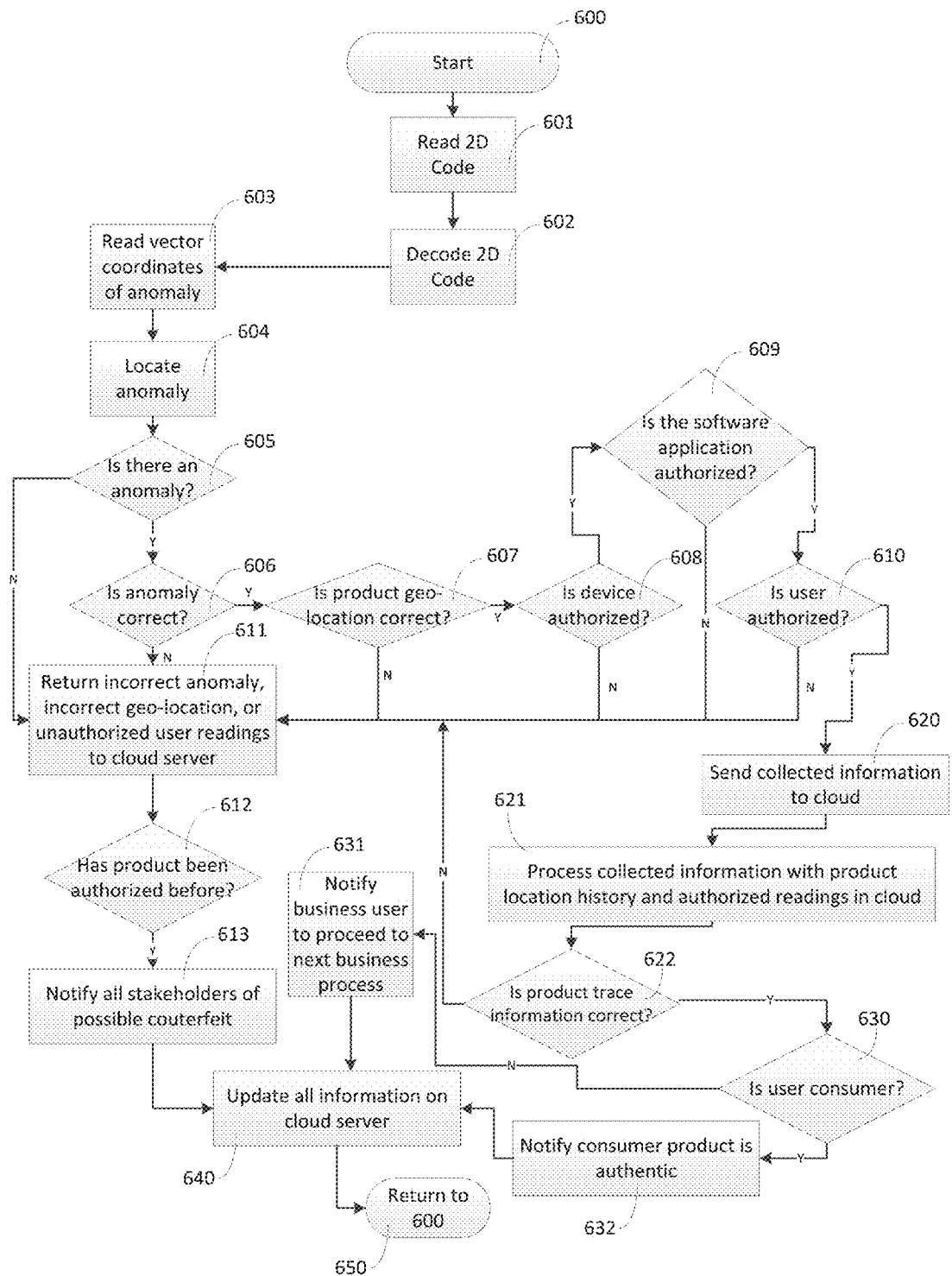
FIG. 6 is a flow chart illustrating a process for authenticity verification according to another embodiment of the present patent application.

FIG. 6 is a flow chart illustrating a process for authenticity verification according to another embodiment of the present patent application. Referring to FIG. 6, after the process starts (step 600), and after the 2D code is read (step 601) and decoded (step 602), vector coordinates of the anomaly is interpreted from the 2D code (step 603). Then the system attempts to locate the anomaly (step 604) with the vector coordinates. If there is an anomaly (step 605), the anomaly is correct (step 606), the product geo-location is correct (step 607), the scanning device is authorized (step 608), the software application is authorized (step 609), and the user is authorized (step 610), then collected information is sent to the cloud servers (step 620) to be processed with the product location history and authorized readings (step 621). After that, if the product trace information is correct (step 622), a notification is sent to the consumer (step 632) or the business user (step 631) that the product is authentic, depending on whether the user is a consumer (step 630) or a business user. After that, all information is updated on the cloud servers (step 640), followed by returning to the step 600 (step 650). In any case that there is no anomaly detected (step 605), the anomaly is not correct (step 606), the product geo-location is not correct (step 607), the device is not authorized (step 608), the software application is not authorized (step 609), the user is not authorized (step 610), or the product trace information is not correct (step 622), the incorrect information will be returned to the cloud servers (step 611), and if the product has been authorized before (step 612), all stakeholders of the product will be notified of possible counterfeit (step 613). After that, all information will be updated on the cloud servers (step 640), followed by returning to the step 600 (step 650).

According to another embodiment, a method for authenticity verification includes generating a unique product identity (UPID) code corresponding to a product; encoding the UPID code into a 2D code; attaching the 2D code to the product; generating an anomaly to be inserted into a standard pattern attached to the product; locating and identifying the anomaly from the product; capturing the 2D code; and determining the authenticity of the 2D code and the anomaly and determining the authenticity of the product accordingly. The method may further include the step of verifying the geo-location of the product and the identity of a user and determining the authenticity of the product accordingly.

According to yet another embodiment, a system for authenticity verification includes means for generating a unique product identity (UPID) code corresponding to a product; means for encoding the UPID into a 2D code; means for attaching the 2D code to the product; means for generating an anomaly to be inserted into a standard pattern attached to the product; means for capturing the 2D code and the anomaly; means for locating and identifying the anomaly from the product; means for collecting, storing, verifying, and managing the identity of all users of the system; means for identifying, collecting and communicating the geo-location information of the product; and means for verifying the 2D code and the anomaly and determining the authenticity of the product accordingly. The product is determined to be authentic if the 2D code, the anomaly, the user identity and the geo-location are verified to be consistent with a predetermined profile.

Overall, with the system and the method for authenticity verification provided by the above embodiments, product authenticity is protected and certified via the use of multiple technologies including the use of anomalies, anomaly detection and anomaly positioning (position locating). In addition, with all parties using the same system and method as described in the embodiments and all users of each party follow through with the scanning of the product upon handing over and receiving the product, this system and method significantly prevents global counterfeiting activities.

The system and method in the aforementioned embodiments are easily and readily incorporated and implemented into numerous industries and sectors, including but not limited to, technology, medicine, pharmaceuticals, life-sciences, government, tax, defense, law-enforcement, diplomacy, international trade, retail, agriculture, live-stock, online commerce, transportation, space, education and etc. With visibility provided to all stakeholders about the product authenticity information, location information, tracking and tracing information, and user verification information, each stakeholder can make informed and better production, logistics, distribution, retailing, promotion, sales and management decisions.

While the present patent application has been shown and described with particular references to a number of embodiments thereof, it should be noted that various other changes or modifications may be made without departing from the scope of the present invention.

What is claimed is:

1. A system for authenticity verification comprising:
    a unique product identity generation system (UPIDGS) configured for generating a unique product identity (UPID) code corresponding to a product;
    an anomaly generation and identification system (AGIS) connected with the UPIDGS and configured for generating an anomaly to be inserted into a standard pattern attached to the product;
    a database and information management system (DBIMS) connected with the UPIDGS and the AGIS; and
    a unique product identity verification system (UPIDVS) connected with the DBIMS and configured for receiving information from the DBIMS and verifying the authenticity of the product based on the authenticity of the 2D codes and the anomaly; wherein:
    the 2D codes are attached to the product and captured by the DBIMS;
    the AGIS is configured to locate and identify the anomaly from the product; and
    the DBIMS is configured to determine the authenticity of the 2D codes and the anomaly;
    wherein the AGIS is configured to insert a reference marker into the standard pattern, the reference marker providing a vector based coordinate within an assigned area on the product for locating the position of the anomaly;
    the system further comprising:
    a scanning device, wherein the scanning device is configured to capture the anomaly, the reference marker and the 2D codes from the product; and
    a user identity management system (UIMS) and a global time and positioning system (GTPS) both connected with the DBIMS, the UIMS being configured to collect, store, verify, and manage the identity of all users of the system, the GTPS being configured to identify, collect and communicate the time and geo-location information of the scanning device, wherein the DBIMS is configured to verify the geo-location of the scanning device transmitted from the GTPS, and the identity of a user transmitted from the UIMS.

2. The system of claim 1, wherein the UPID code is a unique string of alphabet-number-symbol-character (ANSC) combination.

3. The system of claim 2, wherein one of the two 2D codes is an overt 2D code that can be directly seen by human eyes, the other one of the two 2D codes is a covert 2D code being directly visible and masked by a tamper-evident material, and for an authentic product, the two 2D codes match with each other.

4. The system of claim 3, wherein the UPID is encoded into the covert 2D code with a code symbology, while the overt 2D code contains product information that matches the UPID.

5. The system of claim 3, wherein the overt and covert 2D codes are identical and encoded from the UPID with a 2D code symbology.

6. The system of claim 3, wherein the overt 2D code and the covert 2D code represent a first ANSC string and a second ANSC string respectively, the first and second ANSC strings being combined to produce the UPID, a predetermined ANSC string, or a predetermined ANSC string with the UPID.

7. The system of claim 3, wherein one of the two 2D codes is encoded from the UPID, the other 2D code is encoded from an ANSC string, and the combination of the UPID and the ANSC string is a predetermined ANSC string.

8. The system of claim 1, wherein the scanning device is configured to encrypt information and exchange the encrypted information with the DBIMS through bluetooth, infrared, WIFI, 2G, 3G, 4G, or LTE communication.

9. The system of claim 1, wherein one of the 2D codes contains vector position data indicating a relative position of the anomaly on the product.

10. The system of claim 1, wherein upon UPIDVS determining a product is not authentic, the DBIMS is configured to flag the UPID of the product as being under investigation, to record traces of the user, and to inform the product's stakeholders of the incident.

11. A method for authenticity verification comprising:
    generating a unique product identity (UPID) code corresponding to a product;
    encoding the UPID code into a 2D code;
    attaching the 2D code to the product;
    generating an anomaly to be inserted into a standard pattern attached to the product;
    locating and identifying the anomaly from the product;
    capturing the 2D code; and
    determining the authenticity of the 2D code and the anomaly and determining the authenticity of the product accordingly;
    further comprising the step of verifying the geo-location of the product and the identity of a user and determining the authenticity of the product accordingly.

12. The method of claim 11, wherein the UPID is encoded into an overt 2D code that can be directly seen by human eyes, and further encoded into a covert 2D code, the covert 2D code being masked by a tamper-evident material and made of a material that dissolves or disappears upon reaction with the environment.

13. The method of claim 12 further comprising the step of inserting a reference marker into the standard pattern, and the step of scanning the anomaly, the reference marker and the 2D codes.

14. The method of claim 11 further comprising the step of upon determining a product is not authentic, flagging the UPID of the product as being under investigation, recording traces of the user, and informing the product's stakeholders of the incident.

15. A system for authenticity verification comprising:
    means for generating a unique product identity (UPID) code corresponding to a product;
    means for encoding the UPID into a 2D code;
    means for attaching the 2D code to the product;
    means for generating an anomaly to be inserted into a standard pattern attached to the product;
    means for capturing the 2D code and the anomaly;
    means for locating and identifying the anomaly from the product;
    means for collecting, storing, verifying, and managing the identity of all users of the system;
    means for identifying, collecting and communicating the geo-location information of the product; and
    means for verifying the 2D code and the anomaly and determining the authenticity of the product accordingly; wherein:
    the product is determined to be authentic if the 2D code, the anomaly, the user identity and the geo-location are verified to be consistent with a predetermined profile;

the system further comprising means for verifying the geolocation of the product and the identity of a user and determining the authenticity of the product accordingly.

* * * * *